United States Patent [19]

Högbacka

[11] Patent Number: 5,209,324
[45] Date of Patent: May 11, 1993

[54] METHOD FOR CONTROLLING A SOOTBLOWER LUBRICATION SYSTEM

[75] Inventor: Jaakko Högbacka, Kuusamo, Finland

[73] Assignee: Safematic Oy, Muurame, Finland

[21] Appl. No.: 891,047

[22] Filed: Jun. 1, 1992

[30] Foreign Application Priority Data

Jun. 3, 1991 [FI] Finland .................... 912670

[51] Int. Cl.⁵ ............................................. F16N 27/00
[52] U.S. Cl. ..................... 184/7.4; 184/6.1; 122/379
[58] Field of Search ............. 184/6.1, 7.4, 15.1, 184/15.2, 15.3, 6.4; 122/379, 380; 417/12

[56] References Cited

U.S. PATENT DOCUMENTS

| | | | |
|---|---|---|---|
| 3,463,268 | 8/1969 | Krause | 184/6.1 |
| 4,346,674 | 8/1982 | Merritt, Jr. | 122/390 |
| 4,520,902 | 6/1985 | Snow | 184/7.4 |
| 4,537,285 | 8/1985 | Brown et al. | 184/15.2 |

OTHER PUBLICATIONS

Babcock et al., "Diamond Power Specialty Company", (no date), pp. 1-8.
Safematic Inc., "Safelubric", (no date), pp. 1-13.
Denco Farval, "Denco Farual Single Line Systems", Jan. 1982, pp. 1-3.
Safematic Inc., "Safegrease Centralized Greasing System", (no date), pp. 1-4.

Primary Examiner—Richard R. Cole
Assistant Examiner—Alan B. Cariaso
Attorney, Agent, or Firm—Cushman, Darby & Cushman

[57] ABSTRACT

A method for controlling a sweeper lubrication system which includes a lubricant container, a pump, and sootblower specific lubricator connected to a sootblower by pipelines for passing lubricant to each sootblower. For reliability, the operation of the pump is controlled by a timer and the sootblower specific lubricator of each sootblower is controlled on the basis of the operation or movement of the respective sootblower.

5 Claims, 3 Drawing Sheets

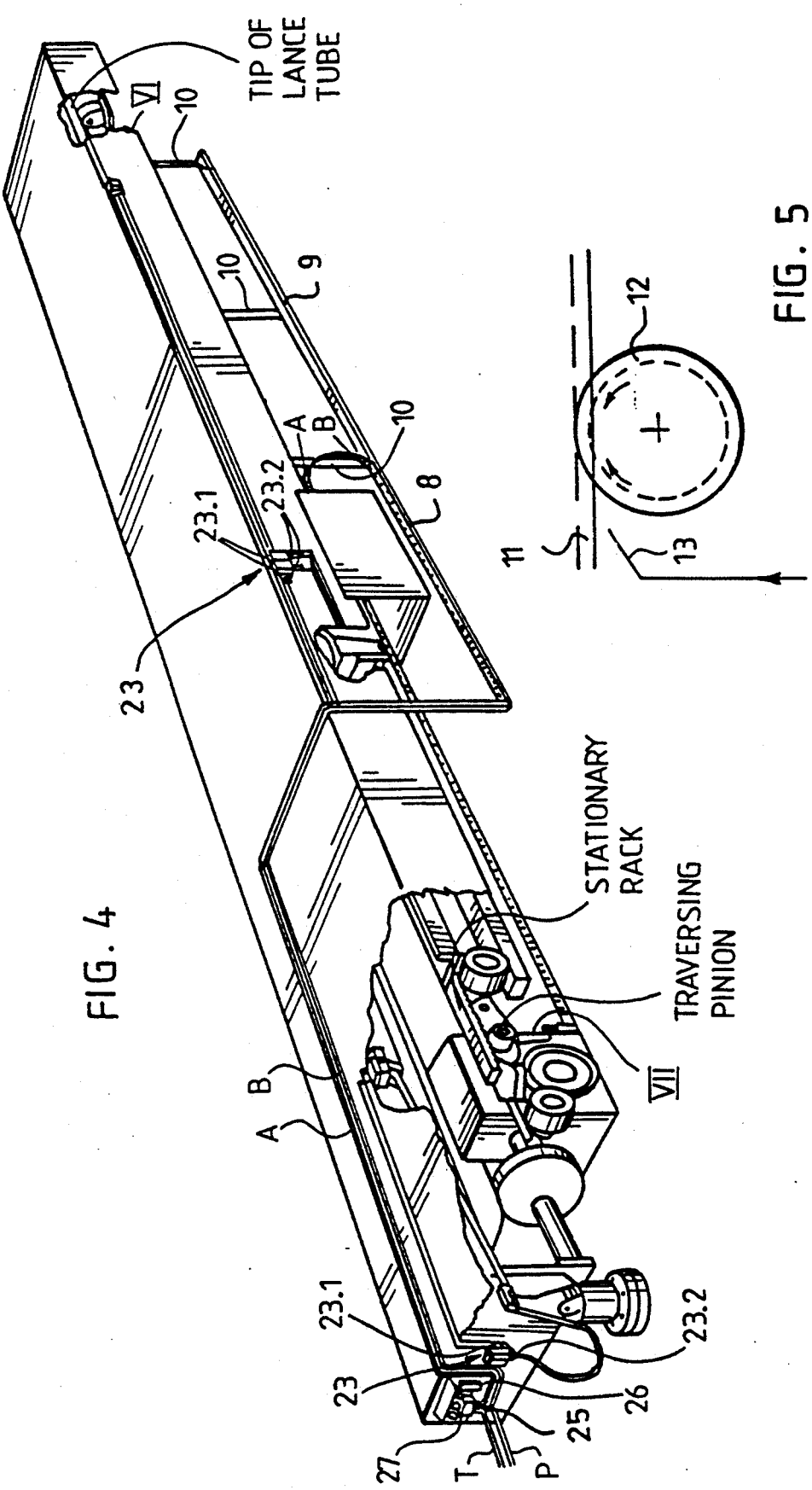

METHOD FOR CONTROLLING A SOOTBLOWER LUBRICATION SYSTEM

BACKGROUND OF THE INVENTION

The invention relates to, a method for controlling a lubrication system for a sootblower comprising a lubricant container, a pump, and sootblower specific lubrication means connected to at least one sootblower by pipelines for passing lubricant to each sootblower.

Sootblowers are used for cleaning the walls and conduits in power plant boilers and soda recovery boilers. They comprise a part performing a back-and-forth movement, which is fixed, e.g., to a stationary part and provided with a nozzle through which a cleaning fluid is applied to the surface to be cleaned. The cleaning fluid is mostly steam.

A steam boiler may be equipped with a great number of sweepers. For example, certain boiler constructions may comprise more than a hundred sweepers. Each sweeper is connected to a separate instrumentation which determines the local sootblower requirement. Each sweeper follows its own schedule, which depends on how rapidly the respective area gets dirty. Sweepers are installed at greatly varying heights from the ground; some of them are positioned at the top and the other at the bottom on different sides of the boiler.

The lubrication of sweepers has proved to be difficult mainly for the following reasons. The number of lubrication points in the boiler is often very great, and the lubrication points are difficult to access, as one also has to move vertically to reach them. The lubrication requirements also vary greatly from one boiler lubrication point to another. Problems are also caused by the relatively long gear rack which requires proper lubrication to operate reliably in all conditions.

Previous attempts to provide an economical, extensive and automatic sweeper lubrication system have not been successful.

SUMMARY OF THE INVENTION

The object of the invention is to provide a method by means of which the drawbacks of the prior art can be eliminated. This is achieved by means of the method according to the invention, which is characterized in that the operation of the pump is controlled by means of a timer and that the sootblower specific lubrication means of each sootblower are controlled on the basis of the operation or movement of the respective sootblower.

An advantage of the invention is mainly that the amount of the lubricant used in the lubrication can be controlled very accurately and nevertheless obtain an adequate lubrication result. As compared with the prior art, the invention also provides considerable savings in cable; laying and pipelines. A further advantage of the invention is that it is simple so that its installation and operation cost is advantageous. In spite of its simplicity, the invention provides for an even lubrication of the gear rack, and so it is ensured that the gear rack and thus the entire sootblower operate reliably. When needed, the lubrication stage can be initiated very simply when a respective sootblower begins to move either inward or outward, etc.

BRIEF DESCRIPTION OF THE DRAWING

In the following the invention will be further disclosed by describing preferred embodiments which are shown in the attached drawings, in which:

FIG. 4 is a general view of sootblower (also known as a sweeper) provided with means useful for practicing the method according to the invention; and FIG. 5 shows a general view of one special feature of the method according to the invention.

DETAILED DESCRIPTION

Figure 1:
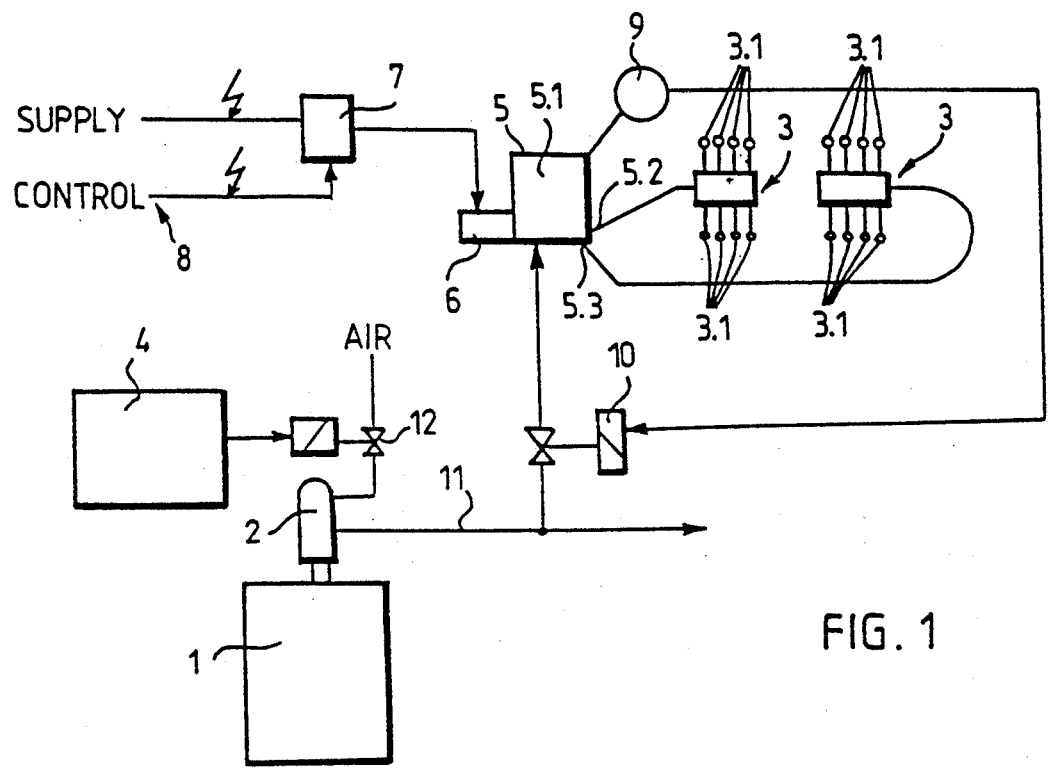
FIG. 1 is a general schematic view of a first embodiment of a sootblower lubrication control system applying the method according to the invention.

FIG. 1 shows a first embodiment sootblower lubrication control system applying the method according to the invention. The reference numeral 1 indicates a lubricant container, such as a grease container. The reference numeral 2 indicates a pump. The reference numeral 3 indicates generally sootblower specific lubrication means, that is, distributors.

In FIG. 1, the reference numeral 4 indicates a timer, and the reference numeral 5 indicates a lubricator used in this embodiment. The drive motor of the lubricator is indicated by the reference numeral 6.

According to the principles of the invention the operation of the pump 2 is controlled by means of the timer 4 and the sootblower specific lubrication means 3 of each sootblower are controlled on the basis of the operation or movement of the respective sweeper.

In principle, the embodiment of FIG. 1 operates as follows. The timer 4 provided in connection with the pump 2 is programmed to cause the pump to be switched on, even for several hours, and to be switched off, even for several days. When the pump is in operation, that is, when it pressurizes the pipeline extending from the lubricant container 1 to the lubricator 5, the lubricator 5 is filled with a lubricant, such as grease.

The drive motor 6 of the lubricator 5 obtains a voltage when the respective sootblower moves in either direction. The sootblower is not shown in FIG. 1, but only conductors drawn from the sootblower through a contractor 7 to the drive motor 6 are visible. The principal features of the sootblower are shown in FIG. 4. The progressive distributors 3 distribute the lubricant from the two outlets of the lubricator to the lubrication points. The long gear rack will be lubricated evenly, as both ends of the gear rack are lubricated over rather a long distance, from which the lubricant is carried by means of the rack wheel over the entire gear rack.

It is essential that the lubricator 5 feed lubricant to the distributors, and further to the lubrication points, only when the sootblower begins to move in either direction. However, it is, of course, possible to arrange the lubrication to take place only when the sootblower moves in one direction. The signal to the drive motor of the lubricator can be obtained either from the voltage of the operating means of the sootblower or the movement of the sootblower by means of limit switches.

The lubricant is passed from the stationary part of the sootblower to the movable part of the sootblower by means of a lubricant hose controlled by an energy transfer chain 8. The energy transfer chain is a chain which means is trough-like in transverse cross-section; it supports the lubricant hose. The energy transfer hose appears clearly in FIG. 4. The path of the energy transfer chain 8 is controlled by means of supports and a support bridge 9 which is positioned below the sootblower. The lubricant is preferably passed directly to the mesh of the rack wheel 12 of the gear rack 11, as shown in FIG. 5.

FIG. 1 also shows the principal features of a connection which prevents entrance of the lubricant to the lubricator 5 when the upper limit of the lubricant in the lubricator rises into a predetermined level. The closing means is a valve 10.

FIG. 1 shows only the lubrication system associated with a single sootblower. It should be apparent that in a typical system in which the method of the invention will be practiced, there are several such systems, that is, one for each of a respective plurality of sootblowers, with the exception of the lubricant container and the pump, of which there may be, e.g., one or two in the boiler.

Figure 2:
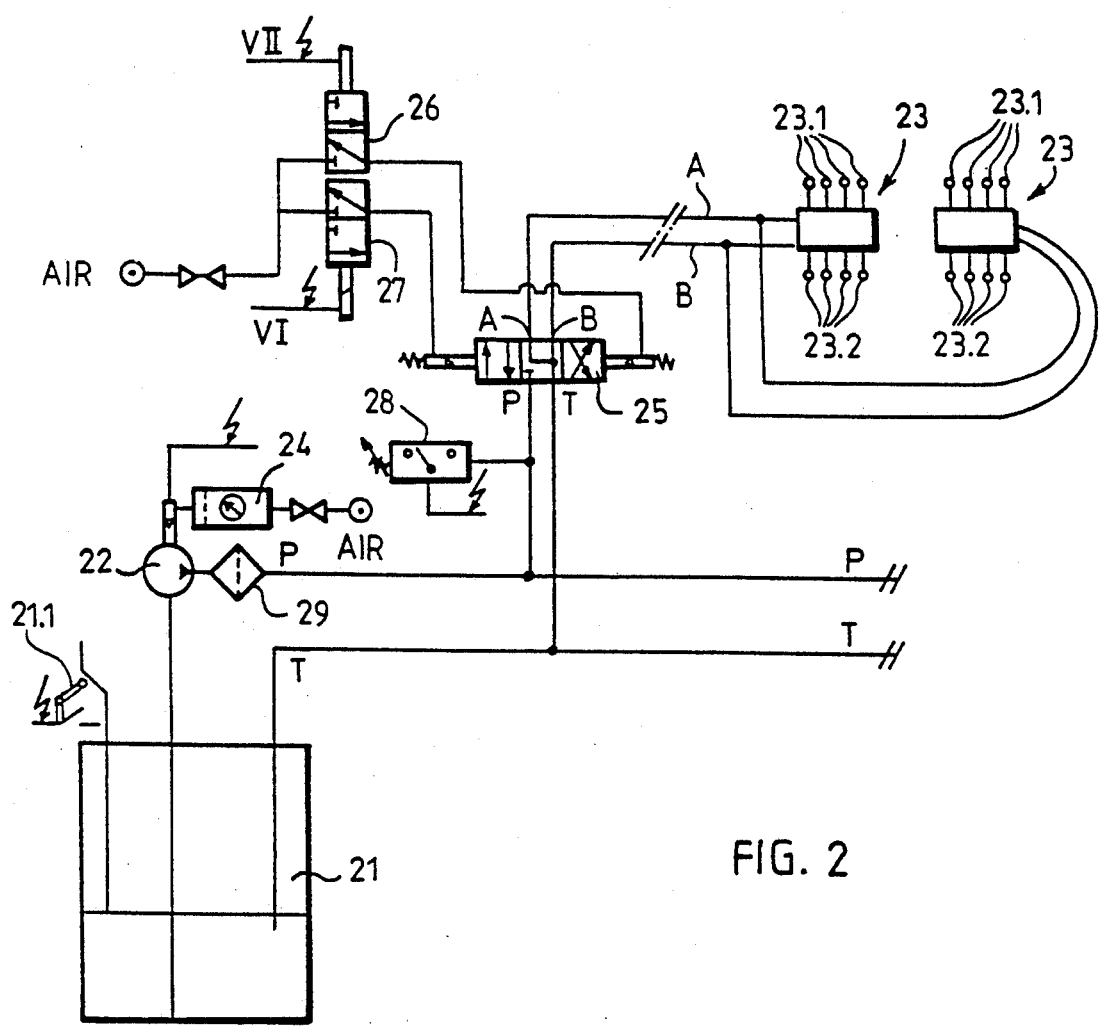
FIG. 2 is a general schematic view of a second embodiment of a sootblower lubrication control system applying the method according to the invention.

FIG. 2 shows a second embodiment of a sootblower lubrication control system invention, associated with two-pipe distributors. The reference numeral 21 indicates a lubricant container, and the reference numeral 22 indicates a pump. The reference numeral 23 indicates general sootblower specific lubrication means. Also in this embodiment, a timer 24 is arranged to be programmed to cause the pump 21 to be switched on, even for several hours, and to be switched of, even for several days. The lubrication can take place when the pump 22 pressurizes the pipeline through which the lubricant is passed from the lubricant container to the sootblower specific lubrication means, i e. distributors 23.

When the sootblower moves inward, a line I is pressurized, and when the sootblower moves outward, a line II is pressurized if the timer has caused the pump to be switched on. A, signal indicating the inward movement of the sootblower is obtained from point VI and a signal indicating its outward movement from point VII. The distributors positioned in the stationary and the movable part of the sootblower operate when the lines are pressurized one after the other. The lubricant is passed distributors in the movable part of the sootblower by means of a hose and an energy transfer chain, as described above in connection with the embodiment of FIG. 1.

In the embodiment of FIG. 2, the lubricant is passed to the distributors 23 by means of a four-way valve 25 so that signals obtained from the movement of the sootblower, that is, from the points VI and VII, control the movements of the four-way valve 25. In this way, a simple arrangement is obtained in which the lubrication starts when the soothblower begins to move either inward or outward. The four-way valve also is shown in from FIG. 4.

FIG. 2 shows the system associated with a single soothblower on the same principle as in FIG. 1.

Figure 3:
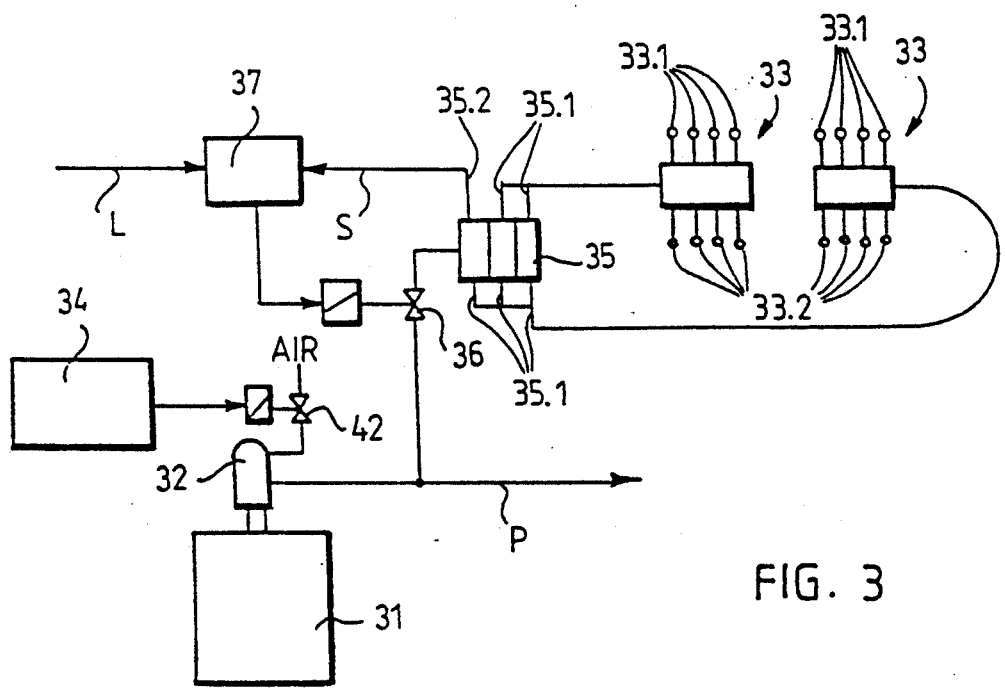
FIG. 3 is a general schematic view of a third embodiment of a sootblower lubrication control system applying the method according to the invention.

FIG. 3 shows a third embodiment of apparatus for practicing the method of the present invention related to progressive distributors. The reference numeral 31 indicates a lubricant container and the reference numeral 32 indicates a pump. The reference numeral 33 indicates generally sootblower specific lubrication means, that is, in this specific embodiment, progressive distributors. This embodiment also comprises a timer 34 which can be programmed to cause the pump to be switched on, even for several hours, or days and to be switched off, even for several days. The lubrication can take place when the pump pressurizes a pipeline from the lubricant container to a progressive main distributor 35. The progressive main distributor is subjected to pressure by means of a valve 36, and so the lubricant flows through the main distributor 35 to the distributors 33, if the pump is on. The main distributor 35 stops when the valve 36 is closed. The valve 36 is controlled by means of a control part 37. A signal obtained from the movement of the sootblower is applied to the control part, the signal being indicated generally by the reference character L. The pressurization of the progressive main distributor 35 begins when the sootblower starts to move inward or outward, that is, the control part 37 opens the valve 36 in response to the signal L, and so the pressure created by the pump is able to act on the main distributor 35 and the lubrication can be performed.

FIG. 3 shows an embodiment of apparatus for practicing the method of the invention on the same principle as in FIGS. 1 and 2. Also in this embodiment, the lubricant is passed from the stationary part of the sootblower to the movable part by means of a hose and an energy transfer chain, as described above.

It is essential in all the embodiments described above, that the timer and the sweeper specific control means operate in co-operation with each other, that is, the lubrication takes place only if the pump is in operation and the sootblower moves or operates.

The embodiments described above are by no means intended to restrict the after "but the", invention, but the practice of the method of the invention can be modified within the scope of the c desired. Accordingly, it is to be understood that the apparatus utilizing the method according to the invention need not necessarily be exactly similar to that shown in the figures, but other solutions are possible as well. The operating times of the timer, that is, the time periods during which the pump is on and off, are not restricted in any way but they can be determined according to the requirements in each particular case. For instance, the pump may be on for a period of time long enough each sootblower to be in operation so that each sootblower will be lubricated appropriately.

I claim:

1. A method for controlling a sootblowers lubrication system for at least one sootblower each of which includes a stationary portion, a movable portion which extends and retracts relative to the stationary portion, and a power source for extending and retracting the movable portion relative to the stationary portion, which lubrication system includes a lubricant container, a sootblower-specific lubricator for each said sootblower with distributors for distributing lubricant to each of a plurality of sites on each said sootblower for lubricating between said stationary and movable portions thereof, a lubricant distribution lien effectively extending between said lubricant container and each said sootblower-specific lubricator, a pump operable for pumping lubricant from said lubricant container through said lubricant distribution lien to each said sootblower-specific lubricator, and, for each said sootblower, a respective lubricant flow control device interposed in said lubricant distribution line, between said pump and the respective said sootblower, said method comprising:

(a) automatically intermittently operating said pump by using a timer operatively associated with the pump, so that during some, first periods, lubricant is being replenished through said lubricant distribution line from said lubricant container, and during other, second periods, lubricant is not being replenished through said lubricant distribution line from said lubricant container;

(b) sensing an activity which corresponds to movement of said movable portion of each sootblower relative to said stationary portion thereof, and applying such sensation automatically to enable each said lubricant flow control device only when the respective said sootblower movable portion has moved at least to a predetermined amount in at least one direction relative to the respective said sootblower stationary portion.

2. The method of claim 1, wherein:
step (b) comprises sensing an electrical activity which corresponds to said movement.

3. The method of claim 1, wherein:
step (b) comprises sensing a fluid pressure activity which corresponds to said movement.

4. The method of claim 1, wherein:
step (b) comprises sensing a change in position which corresponds to said movement.

5. A controlled sootblower lubrication system, comprising:
at least one sootblower each of which includes a stationary portion, a movable portion which extends and retracts relative to the stationary portion, and a power source for extending and erecting the movable portion relative to the stationary portion, which lubrication system includes a lubricant container, a sootblower-specific lubricator for each said sootblower with distributors for distributing lubricant to each of a plurality of sites on each said sootblower for lubricating between said stationary and movable portions thereof, a lubricant distribution line effectively extending between said lubricant container and each said sootblower-specific lubricator, a pump operable for pumping lubricant from said lubricant container through said lubricant distribution line to each said sootblower-specific lubricator, and, for each said sootblower, a respective lubricant flow control device interposed in said lubricant distribution line, between said pump and the respective said sootblower;

a timer operatively associated with said pump for automatically intermittently operating said pump so that during some, first periods, lubricant is being replenished through said lubricant distribution lien form said lubricant container, and during other, second periods, lubricant si not being replenished through said lubricant distribution line from said lubricant containers;

means for sensing an activity which corresponds to movement of said movable portion of each sootblower relative to said stationary portion thereof, and applying such sensation automatically to enable each said lubricant flow control device only when the respective said sootblower movable portion has moved at least to a predetermined amount in at least one direction relative to the respective said sootblower stationary portion.

* * * * *